S. Nicholson,
Steering.
Nº 381.  Patented Sept. 12, 1837.
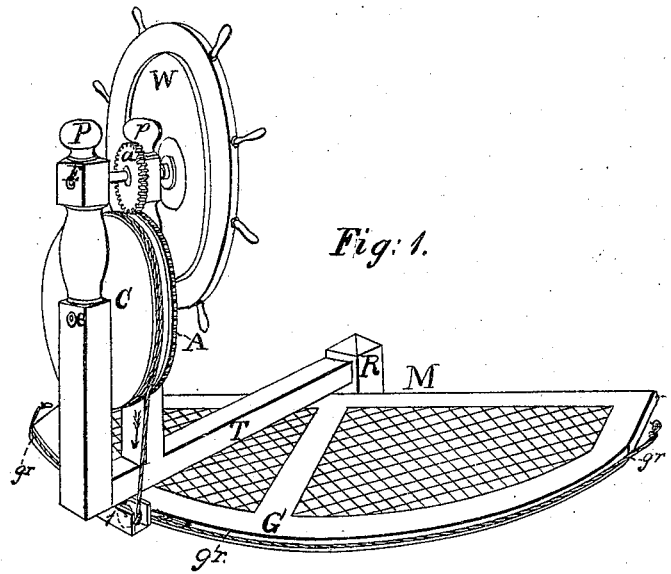
Fig. 1.
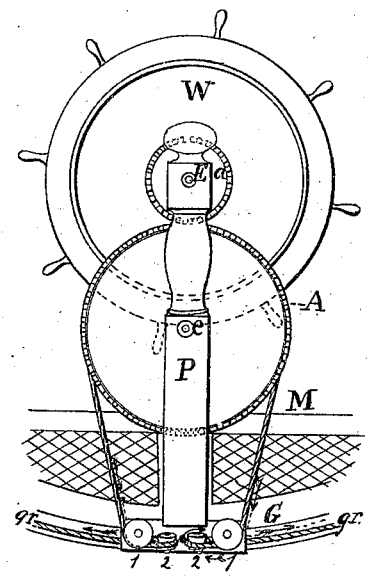
Fig. 2.
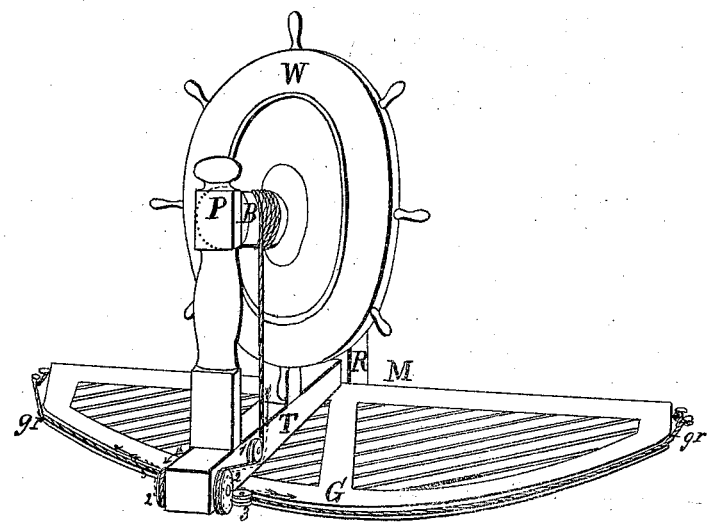

UNITED STATES PATENT OFFICE.

SAMUEL NICOLSON, OF BOSTON, MASSACHUSETTS.

STEERING APPARATUS FOR SHIPS, VESSELS, &c.

Specification of Letters Patent No. 381, dated September 12, 1837.

*To all whom it may concern:*

Be it known that I, the undersigned, SAMUEL NICOLSON, of Boston, in the county of Suffolk and Commonwealth of Massachusetts, gentleman, have invented a new and useful Improvement in Steering-Wheels of Vessels, which I denominate Nicolson's Steering-Wheel and Guide, and which is fully described in the specification hereinafter set forth and the plates thereto annexed.

My improved steering wheel is formed by erecting two posts, (Plate 1, P, *p*,) about eight inches apart of similar height, shape and dimensions and long enough to accommodate two cog wheels, (A, *a*,) each about two inches thick, placed one above another so as to play into each other, the upper wheel (*a*) being about six inches, the lower wheel (A) being about eighteen inches, in diameter; the upper wheel (*a*) is called the driver, it is fixed upon an axle (E) which passes through the two posts (P, *p*,) projects from the after post (*p*,), so as to have attached to it a common steering wheel (W;) the lower wheel A is fixed under the driver (wheel *a*) on and axle (*e*) turning in the two posts (P, *p*,);—firmly attached to the wheel (A), and of the same diameter with it, is a wooden cylinder (C,) formed with a thin flange on each side of it, and occupying the space between the wheel A and the post farthest from it. Metal cylinders or rims of the relative proportions of the cog wheels, with strong teeth working in an endless chain may be substituted for said wheels.

When my improved steering wheel is made to traverse with the tiller the posts (P, *p*,) with the wheels (A, *a*, W) arranged as above described are fixed in the projecting end of a tiller (T) (as in plate 1 Figures 1, and 2,) the other end of the tiller being (as shown by said plates) fastened in the rudder head, (R) when it is intended the steering wheel shall be permanent, the posts, (P, *p*,) with the wheels (*a*, A, W,) may be placed wherever convenience requires.

Plate 1: The guide consists of a permanent rim or edge (G) fixed upon the line of the arc described by the sweep of that part of the tiller (T) at which the pulleys (1, 1,) of the steering or tiller ropes are attached; this rim or edge is so fixed that the tiller may pass over it and it contains on its outer surface a groove (*g r*) in which a tiller rope will run, it may be formed by laying on the deck forward of the rudder a platform (M,) of fine grating (like that now used for the helmsman to stand upon) contained within the arc before described and having in its outward edge, or circumference the groove (*gr*) before mentioned, or it may be raised on the deck, or under the deck, or it may be fixed abaft the rudder, or wherever the tiller is made to traverse; it may be formed of wood, iron or other material.

When the steering wheel traverses with the tiller my steering wheels and guides are thus put into operation. See Plate 1, Figs. 1 and 2, directly beneath the wooden cylinder, C, on each side of the tiller T and on the edge nearest the guide G is a pulley (1,) turning parallel with the cylinder C; between these pulleys (1, 1,) and on the under side of the tiller (T) two other pulleys (2, 2, Fig. 2) are placed, turning horizontally and in the plane of the groove (*gr*) of the guide (G,) and at right angles with the pulleys (1, 1,) so that the grooves of the latter (1, 1) will be opposite the grooves of the former pulleys (2, 2); the steering rope is then bent around the cylinder (C,) with turns enough to put the helm from hard up to hard down, the ends of the steering rope are then passed from each side of the cylinder (C) down into and partly around the pulleys (1, 1) and being then turned at right angles and passed into and partly around the other pulleys (2, 2,) and being returned between them (2, 2,) and the groove *gr*, they are in this groove led aft and fixed to the belaying pins.

The common steering wheel may be fitted to my guide, above described, by leading the steering rope directly from the barrel (B) of the wheel and altering the arrangement of the pulleys, (as is shown in Plate 2). Thus a pulley (1,) may be placed on each side of the letter T, under the barrel B and turning parallel with the sides of the tiller. Other pulleys (2, 2,) may be placed at the end of the tiller, on each side of it and turning parallel with pulleys (1, 1). Other pulleys (3, 3) may be placed under the tiller, in the plane of the groove, (*gr*) and between that and the pulleys (2, 2) turning horizontally and at right angles with the pulley (2, 2,) and having their grooves opposite to and in the plane with the bottom of, the grooves (2, 2). The ends of the steering rope are then passed down each side of the barrel B, into the pulleys (1, 1,) thence turned at right angles are let to the pulleys (2, 2) thence around these pulleys into the pulleys (3, 3,) thence returned around these pulleys (3, 3,) and between them and the grooves (*gr*) of the guide, they are led aft and fastened to belaying pins.

In steam boats or other vessels a permanent or stationary wheel may be fitted to my guide by leading the steering rope through pulleys on the end of the tiller to and through pulleys on the rudder head and thence to any part of the vessel where the wheel may be fixed.

In the above combinations the arrangement of the pulleys, and the proportions of the wheels and parts, &c., may be varied as circumstances may require.

What I claim as my invention is,

The fixed and permanent guide, distinctly and by itself: and then the combination of the guide with the cogwheels and cylinder (or toothed rim and cylinder with endless chain) forming the machine above described, which I call "Nicolson's steering wheel and guide."

The advantage gained by the guide is the prevention of slack in the steering rope, so that where the tiller traverses the deck, the deck is kept unencumbered for the passage of men, spars, &c., and at all times the movement of the steering wheel is immediately felt by the helm. The advantage of the cog wheels and cylinder, or toothed rim and cylinder and endless chain, is the gaining of power over the cylinder, while that requiring only about three turns of the steering rope, prevents the riding of the rope so frequently and dangerously experienced, on the barrel of the steering wheel heretofore used.

In testimony whereof—I the said SAMUEL NICOLSON hereto subscribe my name in presence of the attesting witnesses this fifteenth day of December A. D. eighteen hundred and thirty six.

SAMUEL NICOLSON.

Witnesses:
JOHN CODMAN,
EDW. G. LORING.